United States Patent [19]

Scorso, Jr. et al.

[11] 4,180,853

[45] Dec. 25, 1979

[54] TWO-STAGE COMMUTATION CIRCUIT FOR AN INVERTER

[75] Inventors: Clifford A. Scorso, Jr., Bolton; Gordon J. Messer, Tolland, both of Conn.

[73] Assignee: United Technologies Corporation, Hartford, Conn.

[21] Appl. No.: 936,277

[22] Filed: Aug. 23, 1978

[51] Int. Cl.² .............................................. H02M 7/515
[52] U.S. Cl. ........................................ 363/96; 363/79; 363/135
[58] Field of Search ............... 307/252 M; 363/79, 96, 363/135–139

[56] References Cited

U.S. PATENT DOCUMENTS

| | | | |
|---|---|---|---|
| 3,249,844 | 5/1966 | Jensen | 363/139 |
| 3,805,141 | 4/1974 | Pompa, Jr. et al. | 363/135 |
| 4,060,757 | 11/1977 | McMurray | 363/135 X |

Primary Examiner—William M. Shoop
Attorney, Agent, or Firm—Richard P. Lange

[57] ABSTRACT

A two-stage commutation circuit for an inverter, each having a different energy storage capability, commutates the main semiconductor switches by creating a commutation pulse suitable for the different levels of load current. This improves overall inverter efficiency by decreasing the circulating commutation current at light loads due to reduced size of the commutation and makeup pulses utilized at the lower load current levels. The control circuit for the dual commutation circuits includes a voltage detector for sensing the level of the DC input voltage and current detectors for sensing the times at which the load current is essentially zero so that the transistion between the commutation circuits will occur without perturbations in the cyclic operation of the inverter.

12 Claims, 3 Drawing Figures

TWO-STAGE COMMUTATION CIRCUIT FOR AN INVERTER

BACKGROUND OF THE INVENTION

1. Field of the Invention

This invention relates to inverters, and more particularly to a two-stage commutation circuit for use in commutating the main thyristors of an inverter.

2. Description of the Prior Art

Inverters are known generally and are devices which transform DC (direct current) electrical energy, such as from a fuel cell or the like, into AC (alternating current) electrical energy suitable for use by utility companies or other consumers of electrical energy. Most inverters include at least one pair of main switching elements connected between the DC energy source and the load. By alternatively actuating each switch, a pulse of electrical energy from the DC source flows through the load first in one direction and then in the reverse direction forming a basic AC waveform.

Numerous different types of switching devices can be employed in an inverter to reverse the current through the load. Semiconductor switches, such as a thyristor, are frequently used in present day inverters and this type of device is typically unidirectional so that the current pulse passes in only one direction from the input terminal to the output terminal when turned on by a suitable signal applied to its control terminal. Some semiconductor switches, as is known, will not immediately change from a conducting to a nonconducting state upon the removal of a control signal from the control terminal but require that the magnitude of the instantaneous current passing from the input terminal to the output terminal be reduced to, and kept at, zero for a predetermined length of time whereupon the semiconductor switch turns off.

The process by which the current is reduced to zero through the semiconductor switch so that it can change from its conducting to its nonconducting state is known as commutation and numerous circuit configurations have been proposed for this function. Many commutation circuits operate by presenting a commutation pulse to the load from a storage device, such as a capacitor or resonant circuit, for a period of greater than the turn off time of the semiconductor switch. Since during this period the load current is supplied by the storage device of the commutation circuit, the magnitude of the current through the semiconductor switch drops to zero for a sufficient period to allow transition to the nonconducting state.

It is well known in the art that the amount of energy stored in the commutation capacitors is a function of the value or capacitance of and the voltage across such capacitors; however, the amount of stored energy required to commutate the semiconductor switches is proportional to the magnitude of the load current, i.e. the greater the magnitude of the load current the more stored energy required to commutate the semiconductor switches. Accordingly, the value of the commutation capacitor is often selected by ascertaining the highest value of load current which must be commutated at the minimum input voltage and then sizing the commutation capacitor such that the necessary commutation pulse can be provided.

A disadvantage of the foregoing method of selection of a commutation capacitor size is that with a single stage commutation circuit, the value of the component parts must be sized to handle the worst case condition, i.e. at maximum load where the input voltage is normally near its lowest level. Accordingly, a large commutation capacitor is required but with such a large commutation capacitor the no-load losses of the inverter are particularly high in that a commutation pulse having a capability for commutating even greater than the full load current is discharged from the storage device during each commutation cycle therefore reducing efficiency.

U.S. Pat. No. 3,805,141 issued Apr. 16, 1974 to Pompa, Jr. et al, assigned to the same assignee as the present application, discloses a commutation circuit for a bimodal inverter which ensures that the main thyristors are commutated during periods of rapidly increasing load current. A single commutation capacitor (item 44) stores electrical energy therein a means is provided for the purpose of reducing the load current flowing through the main thyristors during the commutation period to that required for commutating the semiconductor switch. The time interval between the actuation of the auxiliary commutation circuit and the actuation of the main control rectifier is varied as a function of load in order to ensure that the commutation capacitor is adequately charged to provide a sufficient commutation pulse to decrease the main thyristor current to zero. But at lower levels of load current the time interval between the actuation of the auxiliary commutation circuit and the actuation of the main control rectifier is increased so that the commutation capacitor does not store a significant amount of electrical energy greater than that required to commutate the load current.

SUMMARY OF THE INVENTION

A primary object of the present invention is to provide a two-stage commutation circuit for use in commutating the main semiconductor switches of an inverter.

According to the present invention, a DC-to-AC power inverter has a two-stage commutation circuit, each stage being sized to operate during one portion of the input voltage range, so that the respective stages can accommodate the input voltage variations resulting from the changing power levels. The overall inverter efficiency is enhanced by the reduction in circulating currents at light loads due to the smaller commutation and makeup current pulses utilized at the lower power levels.

According to the present invention, a commutation circuit for a power inverter is provided with a first stage which operates within a first predetermined range of input voltage and a second stage which operates within a second predetermined range of input voltage. The control circuit for switching between the two stages includes a voltage detector for sensing the voltage across the input busses and a current detector disposed to sense when the input current in each of the positive and negative busses is near zero. A circuit discriminator responds to the sensed transition points and switches the control waveform for the commutation thyristors from one stage to the other stage.

Other objects, features and advantages of the present invention will become more apparent in light of the following detailed description of a preferred embodiment as illustrated in the accompanying drawing.

DETAILED DESCRIPTION OF THE ILLUSTRATED EMBODIMENT

Figure 1:
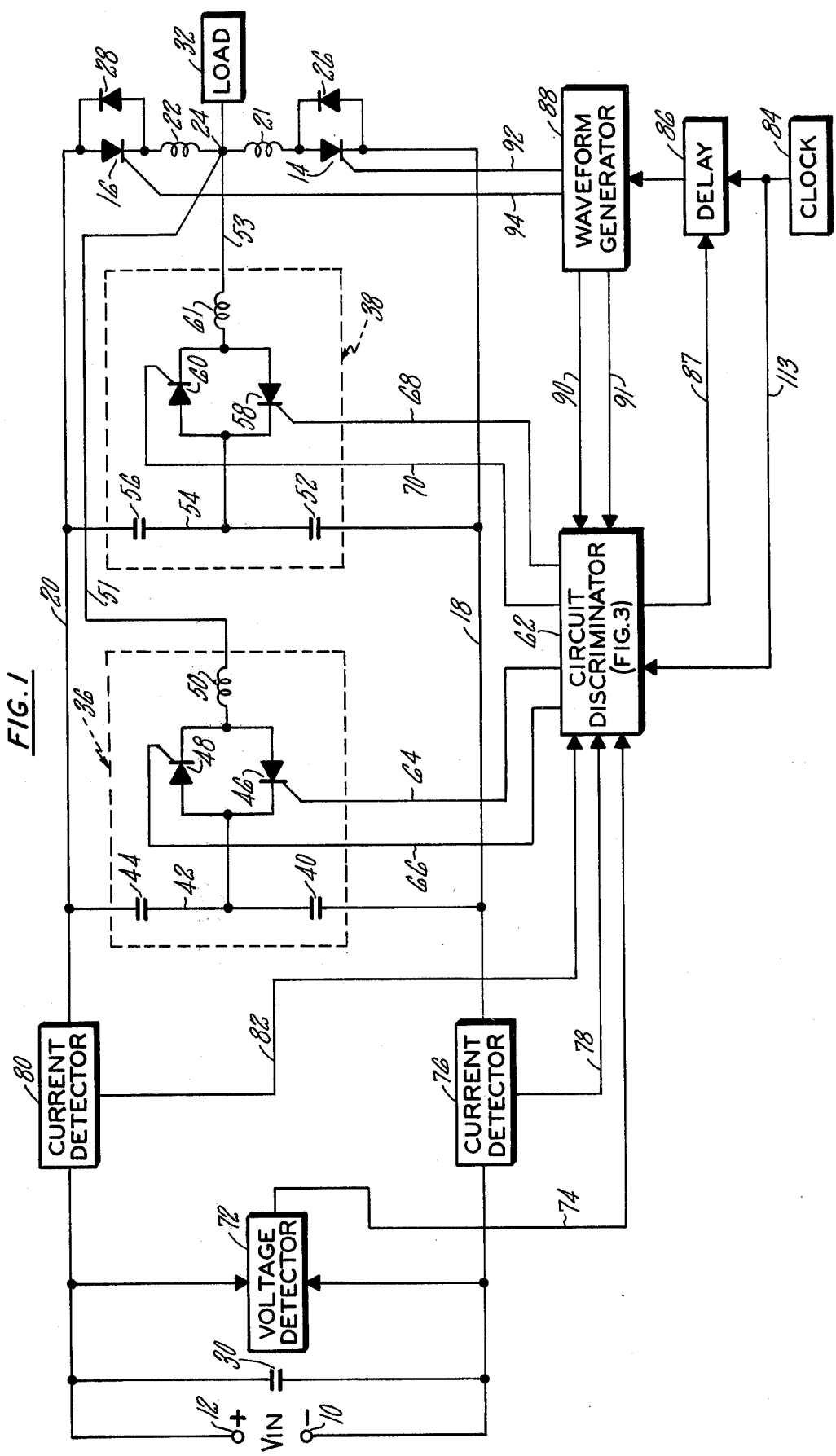
FIG. 1 is a partial schematic diagram of a circuit configuration according to the present invention illustrating a power inverter with a two-stage commutation circuit.

Referring initially to FIG. 1, one embodiment of a DC-to-AC power inverter with a two-stage commutation circuit according to the present invention is illustrated. A negative input bus 10 and a positive input bus 12 receive DC electrical energy from an external source (not shown), such as a fuel cell or the like. A pair of main semiconductor switches, such as thyristor 14 and thyristor 16, are connected by a lead 18 and a lead 20 to the negative input bus 10 and the positive input bus 12, respectively, allowing unidirectional current flow from the external energy source. An inductor 21 and an inductor 22 are connected between the anode of the thyristor 14 and the cathode of the thyristor 16, respectively, and an output node 24. A diode 26 and a diode 28 shunt the thyristors 14 and 16, respectively, for creating a small positive cathode-to-anode thyristor voltage during commutation. A capacitor 30 is connected to leads 18 and 20 for shunting the input busses. The current leaves the inverter via the output node 24 and has a cyclic waveform which typically would include numerous harmonic components of the fundamental sinusoidal waveform. The magnitude of such harmonic components can be reduced by known techniques such as filters, harmonic cancellation, or the like, but such harmonic reduction plays no part in the present invention.

Still referring to FIG. 1, as indicated hereinbefore, many semiconductor switches, such as thyristors 14 and 16, change from their nonconducting state to their conducting state almost instantaneously in response to the application of a suitable control signal to their control terminals. However, in order to change such semiconductor switches from their conducting to their nonconducting state, the current must be reduced to zero for a predetermined period of time, known as the turn off time, before the semiconductor switch will become nonconducting. The process by which a semiconductor switch is transitioned from its conducting to its nonconducting state is generally known as "commutation" and in the present invention is performed by a two-stage commutation circuit comprising a high voltage commutation circuit 36 and a low voltage commutation circuit 38. As is seen, the high voltage commutation circuit 36 includes a capacitor 40 connected by a line 42 to a capacitor 44, the combination of which is connected to the lines 18 and 20 for shunting the input busses. One side of a pair of thyristors 46 and 48, coupled in a back-to-back configuration, is connected to line 42 while the other side is connected to one side of an inductor 50. The other side of the inductor 50 is connected via the line 51 to the output node 24.

The circuit configuration of the low voltage commutation circuit 38 is identical to that of the high voltage commutation circuit 36 but the respective values of the component parts will vary so that the low voltage commutation circuit 36 stores a sufficient electrical energy per cycle for commutation. The low voltage commutation circuit 38 includes a capacitor 52 connected by a line 54 to a capacitor 56, the combination of which is connected to the lines 18 and 20 shunting the input busses. One side of a pair of thyristors 58 and 60, coupled in a back-to-back configuration, is connected to the line 54 while the other side is connected to one side of an inductor 61. The other side of the inductor 61 is connected via a lead 53 in parallel with the high voltage commutation circuit to the output node 24.

As indicated hereinbefore, the thyristor 14 and the thyristor 16 are alternatively rendered conductive to provide current flow from the input busses to the load and the instantaneous current through the switching element must be reduced to essentially zero for a known length of time, or additionally a positive cathode-to-anode voltage may be created to further reduce turn off time, before transition to the nonconducting state will take place.

The control for each of the parallel connected commutation circuits is through a circuit discriminator 62 which renders either the high voltage commutation circuit 36 or the low voltage commutation circuit 38 operative depending on the voltage level across the input busses. Accordingly, the circuit discriminator 62 is connected to the control terminals of the thyristor 46 and the thyristor 48 by a line 64 and 66, respectively, for rendering the switching elements operative at the appropriate time in the commutation cycle. In the same manner, the circuit discriminator 62 is connected to the control terminals of the thyristors 58 and 60 by the lines 68 and 70, respectively, to render the switching elements operative at the appropriate time during the commutation cycle. A voltage detector circuit 72 is coupled to line 18 and line 20 for sensing the variations in the DC input voltage level as a result of changing power levels and presents a signal on line 74 to the circuit discriminator 62 indicating whether the input voltage is greater than or less than a predetermined value. A current detector 76 is connected to sense the magnitude of current flow in line 18 from the negative input bus 10, and when such current is essentially zero presents a signal indicating the same via line 78 to the circuit discriminator 62. In a like manner, a current detector 80 is connected in the line 20 to sense the input current flow from the positive bus 12 and when that current is essentially zero presents a signal indicating the same via the line 82 to the circuit discriminator 62.

A clock 84 provides a timing signal through a controllable delay 86, the operating of which is described hereinafter, to a waveform generator 88 for creating a plurality of signal waveforms which are properly phased related to provide a control pattern of the type required to actuate the inverter. In the "split-C" type of inverter illustrated with the present invention, these waveforms are well known to those of ordinary skill. The waveform generator 88 is connected by a line 90 and a line 91 to the circuit discriminator 62 to provide two commutation switching waveforms for use by either the high voltage commutation circuit 36 or the low voltage commutation circuit 38. The waveform generator 88 is also connected to the control terminals of the thyristors 14 and 16 by a line 92 and 94, respectively, to provide a control signal waveform for alternatively actuating the main semiconductor switches at a rate related to the desired fundamental of the output voltage. A line 87 connects the circuit discriminator 62 to the waveform generator 88 for introducing a short delay in all of the waveforms which control the inverter.

Figure 2:
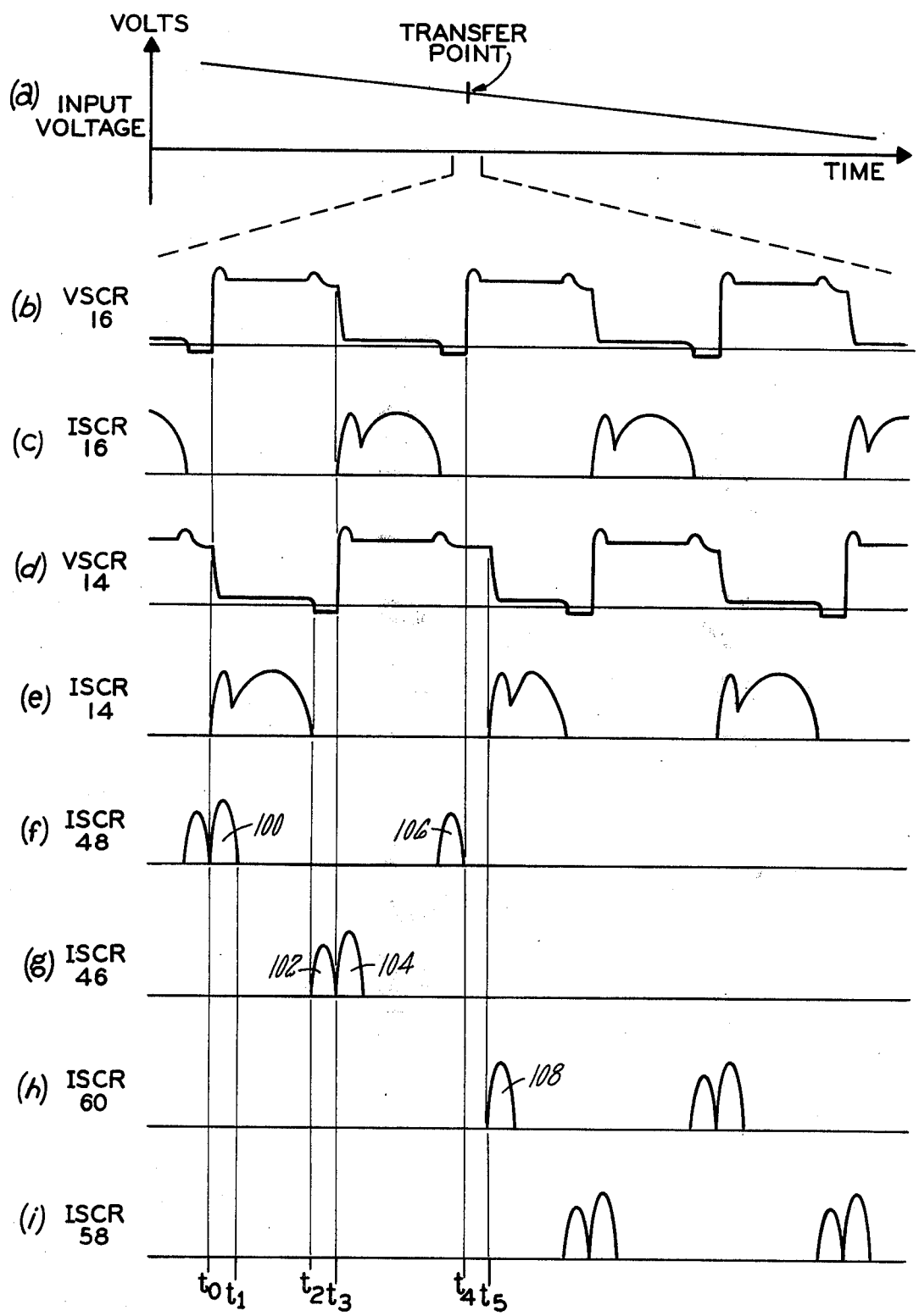
FIG. 2 is a graph illustrating the signal waveforms related to various components shown in FIG. 1 versus time.

In order to appreciate the features of the two-stage commutation circuit according to the present invention, the operation of a split-C type of inverter as shown in FIG. 1 will now be described. Referring additionally to FIG. 2, there is seen a number of illustrations depicting signal waveforms at various points in FIG. 1. For the purposes of this discussion, it will be presumed that the output load current of the inverter increases over a long period of time (FIG. 2(a)) and, as is known, this often results in a decrease in the DC input voltage impressed between the negative input bus 10 and the positive input bus 12 when the external power source is a fuel cell, or the like. The waveforms illustrated in FIG. 2(b) through (i) are an aid in understanding the manner by which the commutation function changes between the low voltage and high voltage commutation circuits, and the illustrated waveforms have been correspondingly simplified by deleting primarily the harmonic components. At the low current condition when DC input voltage is high, the high voltage commutation circuit 36 is employed to commutate the main semiconductor switches; however, when the load current is higher and, thus the input DC voltage is lower, the low voltage commutation circuit 38 is employed to commutate the main semiconductor switches. Referring initially to the time $t_0$ in FIG. 2, the thyristor 16 has just switched to its non-conducting state and the thyristor 14 has been triggered to its conducting state by a signal applied from the waveform generator via line 92 to its control terminal. At the same time, the thyristor 48 in the high voltage commutation 36 is rendered conductive by a signal from the waveform generator 88 applied through the circuit discriminator and line 66 to its control terminal. A large magnitude, short duration pulse of current rings through the circuit consisting of the negative input bus 10, line 18, the thyristor 14, inductor 21, line 51, inductor 50, thyristor 48, to the line 42 where it charges the capacitor 44 positively to a voltage level of approximately (3 Vin/2) while at the same time charging the capacitor 40 negatively to a voltage level of approximately Vin/2. This current pulse, identified in FIG. 2(f) as item 100, is known as a "makeup" pulse and lasts until time $t_1$ when the capacitors 40 and 44 approach the aforementioned voltage levels at which time they are suitably charged for commutation. Commutation of the thyristor 14 occurs at $t_2$ and at this point the thyristor 46 is rendered conductive allowing a current flow therethrough, shown in FIG. 2(g) as item 102, which reduces the load current through thyristor 14, depicted in FIG. 2(e), to approximately zero. At the same time, the current pulse 102 produces a small cathode-to-anode positive voltage which allows the thyristor 14 to switch to its nonconducting state. Then, at time $t_3$, the other main semiconductor switch, thyristor 16, is rendered conductive by a signal impressed on its control terminal from the waveform generator 88 to initiate the alternate going portion of the output current cycle. Simultaneously, the thyristor 46 is rendered conductive and a makeup pulse, seen in FIG. 2(g) as item 104, rings therethrough to the capacitors 40 and 44 charging them to a voltage level of approximately (3 Vin/2) and Vin/2, respectively, in preparation for the next commutation. The basic operation of an inverter, such as the "Split-C" type illustrated in the drawing, is well known to those of ordinary skill.

The transition from the high voltage commutation circuit 36 to the low voltage commutation 38 will now be described and it should be understood that it is important that this transfer take place in a predetermined fashion in order to ensure that the low voltage commutation circuit is transmitted from its quiescent state to its properly charged commutation state. Preferably, this transition occurs after the high voltage commutation circuit has switched one of the main semiconductor switches to its nonconducting state and before the other semiconductor switch is turned on so that the current through both input busses is essentially zero. At such a point, illustrated in FIG. 2 as $t_4$, the voltage detector 72 has provided a signal to line 74 and the circuit discriminator 62 indicating that the voltage level across the input busses has decreased to below a predetermined level. At the same time, the current detector 80 provides a signal on line 82 to the circuit discriminator 62 indicating the current through the input bus 12 is near zero. Also at this point, thyristor 16 has just turned off by a commutation pulse, item 106 in FIG. 2(f), so that both semiconductors are now turned off. Rather than immediately render the thyristor 60 conductive to form a makeup pulse 108 for appropriately charging the capacitors of the low voltage commutation circuit 38 at this time, the circuit discriminator 62 delays the initiation of the makeup pulse 108 until time $t_5$ thereby allowing the thyristor 48 in the high voltage commutation circuit 36 to turn off. Then at $t_5$, the thyristors 60 and 14 are rendered conductive by a signal from the waveform generator 88 which has been delayed in the circuit discriminator 62 by a period greater than the turn off time of the thyristor 48. Thereinafter, the low voltage commutation cycle operate in the same manner as has been heretofore described as the load current increases toward its maximum rated value.

Figure 3:
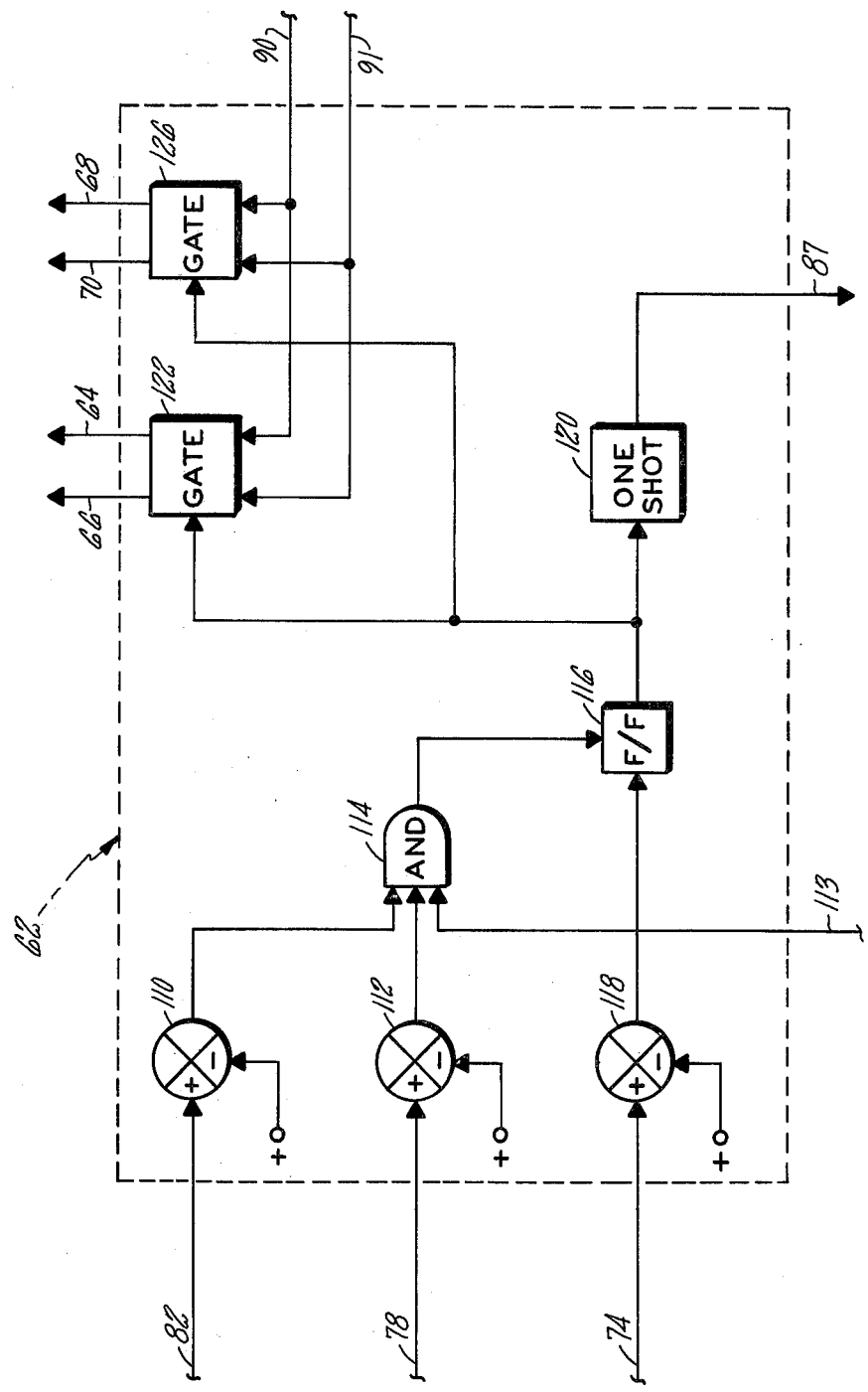
FIG. 3 is a block diagram of the circuit discriminator of FIG. 1.

Referring finally to FIG. 3, there is shown one embodiment of the circuit discriminator 62 for switching from the high voltage commutation circuit 36 to the low voltage commutation circuit 38, and vice versa, depending on the voltage level across the input busses. The lines 82 and 78 are connected to the current detectors in the negative and positive input busses and present a signal proportional to the voltage level to one input of a comparator 110 and a comparator 112, respectively. The other input of each of the comparators 110 and 112 is connected to a preselected source of reference potential so that an output signal is created whenever the current level in one of the busses is near zero. These signals are presented together with a clock signal from a line 113 to the inputs of an AND gate 114 which provides an output signal indicating the simultaneous occurrence of the three conditions for use as a clock signal by flip-flop 116. The line 74 is coupled to the voltage detector 72 and presents a signal to one input of a comparator 118. The other input of the comparator 118 is connected to a source of reference potential which is selected to correspond to the point at which transition between the high and low voltage commutation circuits is desired. Therefore, the output of the comparator changes state at the desired voltage transition point and this transition is clocked through the flip-flop 116 when the current levels on the input bus are zero. A one shot 120 in response to this transition creates a pulse on the line 87 which enables the delay circuit 86 for a period of time corresponding to the turn off time of one of the commutation thyristors, illustrated in FIG. 2 from $t_4$ to $t_5$. The output of the flip-flop 116 is also presented to the control terminal of a gate 122 and to the control terminal of a gate 126. As will be appreciated, if the output of the flip-flop 116 is in one state then the gate 122 only will be enabled allowing the commutation pulses to pass therethrough to the high voltage commutation circuit and, conversely, if the output of 116 is its other state the gate 126 only will be enabled allowing the commutation pulses to pass therethrough to the low voltage commutation circuit 38.

It should be understood that the nature of the transition from the low voltage commutation circuit 38 to the high voltage commutation circuit 36 as the load current decreases will be similar to that just described and a similar delay in the initiation of the makeup pulse will occur.

Although the invention has been shown and described with respect to the preferred embodiment thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. An inverter for converting DC electrical energy from a DC source into an output waveform having at least a fundamental sinusoidal component, said DC source having a voltage range which varies as a function of load current, comprising:
   an input means for receiving electrical energy from a DC source, the voltage level of which varies within a range;
   semiconductor switch means coupled to said input means which can be rendered conductive at a rate related to the fundamental sinusoidal component of the output waveforms;
   commutation means connected to said semiconductor switch means including a first stage which is operable when the input parameters are within a first predetermined range and a second stage which is operable when the input parameters are within a second predetermined range; and
   discriminator means connected to said commutation means for enabling both said first stage at said commutation means and said second stage of said commutation means depending on the input voltage level within said voltage range of said DC source.

2. An inverter according to claim 1, further including a voltage detector means to sense the voltage at said input means and to provide a signal proportional thereto to said discriminator means, and current detector means connected to sense the load current and to provide a signal to said circuit discriminator when said load current is substantially zero so that said commutation means changes the commutation function from said first stage to said second stage when the load current is substantially zero.

3. An inverter according to claim 1, wherein said first stage of said commutation circuit is operative only at lower portion of said voltage range and wherein said second stage of said commutation circuit is operative only at higher portion of said voltage range.

4. An inverter according to claim 1, further including a waveform generator for providing a series of control waveforms to enable both said semiconductor switch means and said commutation means, so that said discriminator means presents said control waveforms to either said first stage of said commutation circuit or said second stage of said commutation circuit depending on the voltage level at said input means.

5. An inverter according to claim 1, wherein said input means includes a negative input and a positive input, and wherein said semiconductor switch means comprises one main thyristor connected between said negative input and the inverter output, and another main thyristor connected between said positive input and the inverter output, and wherein a waveform generator presents a control waveform to said thyristors for alternatively enabling each thyristor, and wherein each stage of said commutation means includes a pair of series connected capacitors for storing electrical energy on a per cycle basis to commutate said main thyristors.

6. An inverter according to claim 5, wherein a delay means responsive to said circuit discriminator is provided for delaying said control waveforms from said waveform generator by a predetermined amount during the transition from the first stage of the commutation means to the second stage of the commutation means, or vice versa, so that the stage of the commutation means utilized after the transition has its series connected capacitors suitably charged for commutation.

7. An inverter for converting DC electrical energy from a DC source into an output waveform having at least a fundamental sinusoidal component, said DC source having a voltage range which varies as a function of load current, comprising:
   input means for receiving electrical energy from a DC source, the voltage level of which varies within a range;
   semiconductor switch means coupled to said input means, which can be rendered conductive in a manner related to the fundamental sinusoidal component of the output voltage waveform; and
   commutation means connected to said semiconductor switch means including a means having a first stage which is operable when the input parameters are within a first predetermined range and a second stage which is operable when the input parameters are within a second predetermined range, depending on the input voltage level within said voltage range of said DC source.

8. An inverter according to claim 7, further including a discriminator means for alternatively enabling either said first stage or said second stage of said commutation means depending on the input voltage level within said voltage range of said DC source.

9. An inverter according to claim 8, further including a voltage detector means to sense voltage at said input means and to provide a signal proportional thereto to said discriminator means, and current detector means connected to sense said load current and to provide a signal to said discriminator when said load current is substantially zero so that transition from said first stage to said second stage, or vice versa, occurs when said load current is substantially zero.

10. An inverter according to claim 7, wherein said first stage of said commutation circuit is operative only when said voltage level of said DC source is at the lower portion of said voltage range, and wherein said second stage of said commutation circuit is operative only when said voltage level of said DC source is at the higher end of said voltage range.

11. An inverter according to claim 1, further including a waveform generator for providing a series of control waveforms to enable both said semiconductor switch means and said commutation means, and further including a discriminator means for presenting said control waveform to either said first stage or said second stage of said commutation circuit depending on the voltage level of said DC source within said voltage range.

12. An inverter according to claim 11, wherein said control waveform includes a plurality of switching points, at which point said semiconductor switch means is normally transitioned between its conducting and nonconducting state, and further including a delay means for extending the switching point occurring between the transition from said first stage to said second stage, or vice versa, of said commutation means.

* * * * *